United States Patent [19]
Anikanov et al.

[11] 3,895,707
[45] July 22, 1975

[54] CONVEYOR FOR TRANSPORTING PLIES OF NEWSPAPERS

[76] Inventors: Nikolia Ivanovich Anikanov, Bolshaya Bronnaya ulitsa, 2/6, kv. 6; Leonid Pavlovich Grachev, ulitsa Lva Tolstogo, 7, kv. 32; Grigory Avramovich Radutsky, 16 Parkovaya ulitsa, 49, korpus 2, kv. 68, all of Moscow; Rafail Efimovich Kheifets, Brest-Litovsky prospekt, 162, kv. 30, Kiev, all of U.S.S.R.

[22] Filed: June 12, 1974

[21] Appl. No.: 478,717

[30] Foreign Application Priority Data
Jan. 18, 1974    U.S.S.R. .............................. 1983003

[52] U.S. Cl. ................. 198/179; 198/131; 198/157
[51] Int. Cl. ............................................. B65g 17/18
[58] Field of Search ........... 198/131, 133, 156, 157, 198/179, 180, 237, 238, 243, 35

[56] References Cited
UNITED STATES PATENTS
| | | | |
|---|---|---|---|
| 973,422 | 10/1910 | Gifford ........................... | 198/180 X |
| 2,291,097 | 7/1942 | Mooney .......................... | 198/180 X |
| 3,050,173 | 8/1962 | Wimmer ......................... | 198/156 X |
| 3,631,770 | 1/1972 | Kratzert et al. ................. | 198/156 X |

FOREIGN PATENTS OR APPLICATIONS
1,136,552    11/1955    France .............................. 198/180

*Primary Examiner*—Richard A. Schacher
*Assistant Examiner*—Richard K. Thomson
*Attorney, Agent, or Firm*—Holman & Stern

[57] ABSTRACT

The invention relates to conveyors for transporting piles of printed matter, and can be employed to utmost effectiveness for conveying piles containing up to 50 newspapers.

The conveyor includes a chain having carriages mounted thereon, each carrying a clamp including two fork-shaped spring-loaded flaps making up a box-like receptacle capable of receiving therein a pile of newspapers.

The ends of the prongs of one said fork-shaped flap are bent toward the prongs of the other fork-shaped flap to retain a pile during travel of the conveyor. Both flaps are pivotably mounted on the carriage by means of pivot pins, whereby the flaps may be alternatingly pivoted to open the box-like receptacle for the loading and unloading thereof.

3 Claims, 5 Drawing Figures

CONVEYOR FOR TRANSPORTING PLIES OF NEWSPAPERS

The present invention relates to conveying means employed in the printing industry and related arts and, more particularly, to conveyors for transporting piles of newspapers.

The present invention can be employed to utmost effectiveness in the conveyance of small piles of newspapers, each containing 50 newspapers, and being delivered from a webfed rotary press.

At present, newspapers leaving the folding apparatus of a web-fed rotary press in a continuous stream are transported by a conveyor comprising a driven endless chain having mounted thereon carriages for joint travel therewith. Each carriage, in turn, has mounted thereon clamps, or grippers adapted to grip each newspaper in the stream by its marginal side, with the grippers being operated by stationary cam means.

This known conveyor ensures reliable transportation of single newspapers; however, it is incapable of transporting piles of newspapers.

At present, special conveyors are being developed for transporting piles of newspapers, comprising a three-dimensional endless driven chain having carriages mounted thereon for joint travel therewith. Each of the carriages has a rod mounted thereon in a cantilever fashion with a platform capable of supporting a pile of newspapers thereon, with the platforms being prevented from rocking by suitable retaining means.

Such conveyors ensure reliable transportation of piles of newspapers, with the position of the platforms being maintained so that the platform is prevented from rocking; however, as a rule, such conveyors are utilized in cases where the plane of the travel of the conveyor does not vary, otherwise the portions of the path of the conveyor, whereat the plane of travel varies, should be associated with additional means thus ensuring the strict horizontality of the platforms with the piles to prevent them from falling off the latter.

The incorporation of these additional means complicates the structure of the conveyor.

Furthermore, in these known conveyors the aforementioned retaining means are met with certain strict requirements concerning their performance.

It is therefore an object of the present invention to provide a conveyor free of the above shortcomings.

It is also an object of the present invention to provide a conveyor for transporting piles of newspapers which would ensure the reliable conveyance of the piles under such conditions that would prevent the piles from falling apart.

It is an important object of the present invention to provide a conveyor for transporting piles of newspapers having a simple structure, and convenient for operation and maintenance.

It is still another object of the present invention to provide a conveyor which can be used for any three-dimensional pathway having portions of the plane of this pathways which are variable.

These and other objects are attained in a conveyor for transporting piles of newspapers comprising a three-dimensional endless driven chain carrying a plurality of carriages thereon for joint travel therewith this conveyor, in accordance with the present invention, having a clamp for each carriage supported thereon, including a pair of spring-loaded fork-shaped flaps together making a box-like receptacle adapted to receive therein a pile of newspapers; the ends of the prongs of one of these fork-shaped flaps being bent toward the prongs of the other fork-shaped flap, so to retain a pile during their travel of the conveyor, with both said flaps being pivotally mounted on said carriage by means of pivot pins, whereby the flaps can be alternatingly pivoted to open the said box-like receptacle for the loading and unloading thereof, and with the endmost prongs of these fork-shaped flaps having less space than those of the rest of these prongs. With the two fork-shaped flaps forming a closed box-like receptacle, the pile of newspapers is reliably retained therein, and presented from falling apart during its travel. The provision of the fork-shaped flap with the bent prongs prevents damaging of the appearance of the end-most newspapers in a pile being clamped, since the entire clamping effort is applied to the side margins of the newspapers, which means that the endmost newspapers are practically out of contact with the flaps.

In order to simplify the structure of the conveyor, it is advisable that alternating opening of the flaps should be effected by means of followers mounted on the flap with the bent prongs, and positioned so to engage stationary cams mounted in the receptacle unloading area, and having a lever mounted on the other flap, and positioned so to engage another cam mounted in the receptacle loading area.

In order to provide for transportation of a succession of piles of newspapers, wherein the folds of the newspapers in each pile are turned through 180° relative to the folds of the newspapers in the adjacent piles it is advisable to incline the fork-shaped flap with the bent prongs in the direction of the folds of the newspapers in the pile being conveyed.

The present invention will be better understood from the following description of an embodiment thereof, with reference to the accompanying drawings, wherein.

Figure 1:
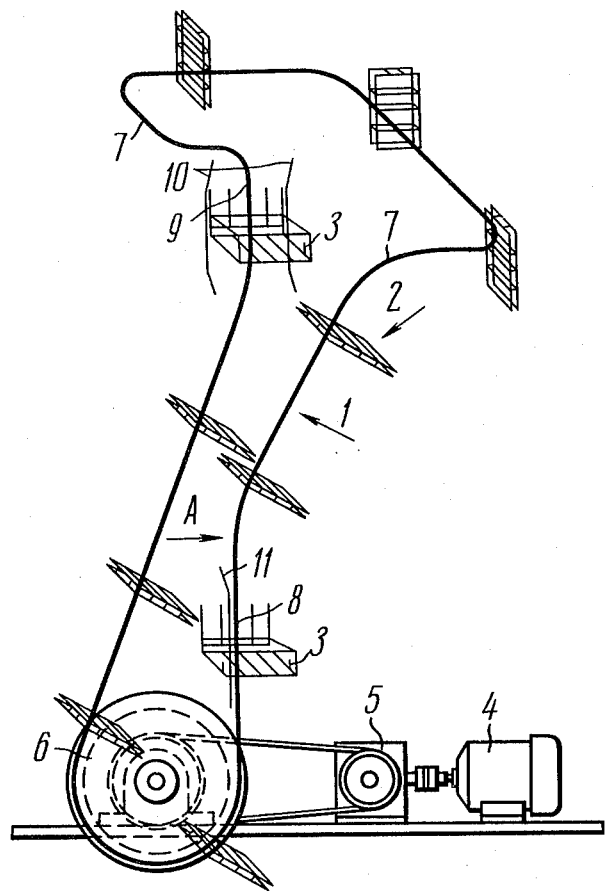
FIG. 1 shows schematically the disclosed conveyor for transporting piles of newspapers.

Referring now to the appended drawings, the conveyor comprises a three-dimensional endless driven chain 1 (FIG. 1) having uniformly spaced therealong clamps 2 for gripping, and conveying piles 3 of newspapers. The chain is set in motion by an electric motor 4 through a reducer 5 and a driving sprocket 6. As can be seen from FIG. 1, the path of the chain 1 includes several portions 7 whereat the plane of this path varies, as well as vertical portions 8 and 9 where the clamps 2 are loaded and unloaded, respectively. Adjacent to these portions 8 and 9, stationary cam plates 10 and 11 are mounted. The chain 1 has mounted thereon carriages 12 (FIG. 2), each provided with rollers 13 received in guides 14 to ride therealong, the guides 14 running in congruence with the chain 1 throughout the path thereof. Each such carriage 12 supports a clamp 2 including two spring-biased fork-shaped flaps 15 and 16 which together makes a closed box-like receptacle adapted to receive a pile of newspapers therein. The ends of the prongs 17 of the flap 16 are bent toward the prongs 18 of the flap 15, so to retain the pile of newspapers during the travel of the chain.

Figure 2:
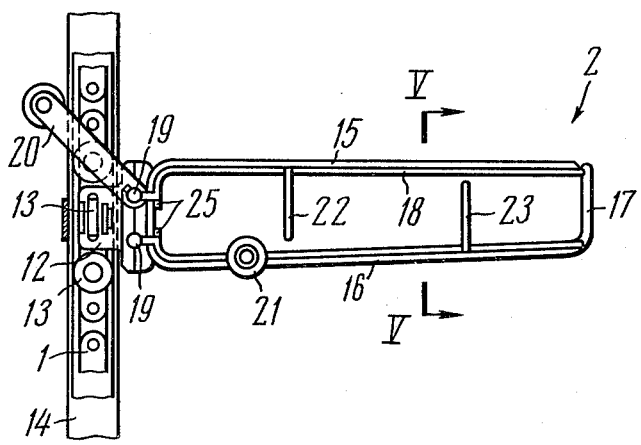
FIG. 2 is a view taken along arrow A in FIG. 1.
Figure 3:
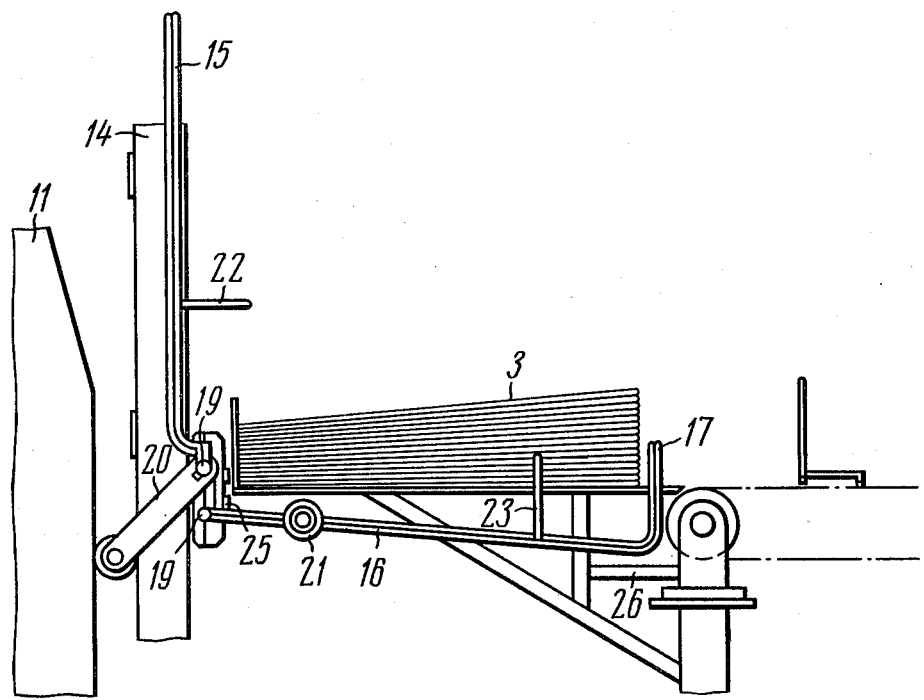
FIG. 3 shows a clamp being loaded with a pile of newspapers.

Each flap 15 and 16 is pivotally mounted on the carriage 12 by means of a pivot pin 19, whereby the flaps are rotatable by a vertical plane, in which means the box-like receptacle formed thereby can be opened for loading and unloading. Pivoting of the flap 15 may be effected by means of a lever 20 (FIG. 3) having one end thereof secured to the pivot pin 19 of this flap. The other end of this lever is positioned so to engage the stationary cam plate 11 mounted adjacent to the portion 8 of the chain 1 (FIG. 1).

The pivoting of the flap 16 (FIG. 2) is effected by means of followers 21 carried by this flap, and positioned so to engage the cam plates 10 (FIG. 1) mounted adjacent to the portion 9 of the chain 1.

The flap 16 (FIG. 3) is slightly inclined in the direction of the folds of the newspapers in the pile being conveyed.

As the folds of the newspapers in each pile are turned through 180° relative to the folds of the newspapers in the preceding and successive piles, the direction of inclination of the flaps 16 alternates in the successive ones of the clamps 2 carried by the chain 1.

Figure 4:
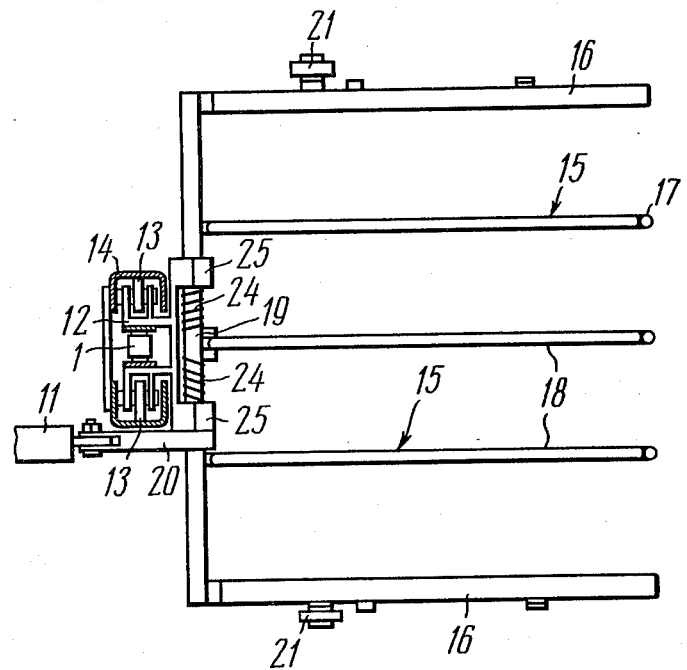
FIG. 4 is a planer view of FIG. 3.

The flaps 15 and 16 have bars 22 and 23 secured therto, respectively, so to form the side walls of the box-like receptacle. This box-like receptacle is closed by the flaps 15 and 16 being urged by the torsion spring 24 (FIG. 4) against the stops 25.

Figure 5:
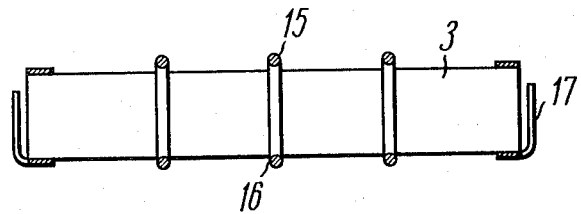
FIG. 5 is a sectional view along line V—V of FIG. 2.

The endmost of the prongs 17 (FIG. 5) of the flap 16 has less space from the prongs 18 of the flap 15 than the rest of the prongs 17, so that the newspapers in the pile being conveyed may be clamped along their side margins.

Piles 3 delivered by the associated web-fed rotary press (not shown) are placed onto a table 26 (FIG. 3) which is fork-shaped to enable loading by the clamps 2.

The conveyor operates as follows.

When the electric motor 4 is energized, the chain 1 starts its travel together with the carriages 12. In the clamp loading area, the lever 20 engages the cam plate 11, whereby the flap 15 is pivoted to open the clamp. As the prongs of the flap 16 pass between the prongs of the table 26, the former lifts the pile thereon. As the conveyor moves on, the lever 20 leaves the cam plate 11, and the spring 24 returns the flap 15 to its initial position, which means that the clamp 2 is closed. As the endmost prongs of the flaps 15 and 16 have less space than the rest of the prongs, the pile is clamped along its side margins. In this positively retained position the piles 3 are conveyed toward the clamp unloading zone which zone the clamp 2 enters in an overturned position, i.e. with the flap 16 now overlying the flap 15. As the followers 21 engage the respective stationary cam plates 10, the flap 16 is pivoted to open the clamp. The now released pile is taken from the clamp by a suitable multi-run conveyor (i.e. a conveyor which may pass between the prongs of the flap 15), e.g. by a chain conveyor (not shown). Upon having left the unloading area, the clamp is closed.

What is claimed is:

1. A conveyor for transporting piles of newspapers, comprising: an endless driven chain running three-dimensionally along a path having loading and unloading portions; a drive associated with said chain; carriages mounted on said chain for joint travel therewith; a clamp mounted on each said carriage, and including a pair of fork-shaped flaps forming a box-like receptacle adapted to receive a pile therein; a pivot pin supported by said carriage, with one of said flaps being pivotally mounted on said pivot pin for pivoting in a vertical plane, with said flap having the prongs thereof bent toward the prongs of the other said flap to retain a pile within said box-like receptacle during travel of said chain; another pivot pin also supported by said carriage, with said other flap being pivotally mounted on said another pivot pin for pivoting in a vertical plane, with the endmost of said prongs of said respective fork-shaped flaps having less space from one another than the rest of said prongs; and with said flaps being pivotable in a vertical plane to open said box-like receptacle for the loading and unloading thereof.

2. The conveyor as claimed in claim 1, wherein said fork-shaped flap with said bent prongs is associated with followers; wherein a stationary cam means is mounted adjacent to said receptacle unloading portion of said path of said chain, to be engaged by said followers to effect pivoting of said fork-shaped flap on said first pivot pin; the other said fork-shaped flap being provided with a lever; the other stationary cam means being mounted adjacent to said receptacle loading portion of said path of said chain to be engaged by said lever to effect pivoting of said other fork-shaped flap on said another pivot pin.

3. The conveyor as claimed in claim 1, wherein said fork-shaped flap with said bent prongs is inclined toward the folds of the newspapers in the pile being conveyed.

* * * * *

UNITED STATES PATENT OFFICE
CERTIFICATE OF CORRECTION

PATENT NO. : 3,895,707
DATED : July 22, 1975
INVENTOR(S) : Nikolai I. Anikanov, et al It is certified that error appears in the above-identified patent and that said Letters Patent are hereby corrected as shown below:

[76] Inventors:

NIKOLAI I. ANIKANOV

Signed and Sealed this thirtieth Day of September 1975

[SEAL]

Attest:

RUTH C. MASON
Attesting Officer

C. MARSHALL DANN
Commissioner of Patents and Trademarks